US009386752B2

(12) United States Patent
Einav

(10) Patent No.: US 9,386,752 B2
(45) Date of Patent: Jul. 12, 2016

(54) INTEGRAL DRIPPER WITH AN ELONGATED EXIT POOL

(75) Inventor: Zvika Einav, Oranim (IL)

(73) Assignee: Deere & Company, Moline, IL (US)

(*) Notice: Subject to any disclaimer, the term of this patent is extended or adjusted under 35 U.S.C. 154(b) by 27 days.

(21) Appl. No.: 14/009,395

(22) PCT Filed: Apr. 2, 2012

(86) PCT No.: PCT/IL2012/050115
§ 371 (c)(1),
(2), (4) Date: Apr. 4, 2014

(87) PCT Pub. No.: WO2012/137200
PCT Pub. Date: Oct. 11, 2012

(65) Prior Publication Data
US 2014/0246520 A1 Sep. 4, 2014

(30) Foreign Application Priority Data
Apr. 3, 2011 (IL) .......................................... 212105

(51) Int. Cl.
*A01G 25/06* (2006.01)
*A01G 25/16* (2006.01)
*A01G 25/02* (2006.01)
*B29C 47/00* (2006.01)
B29C 47/02 (2006.01)

(52) U.S. Cl.
CPC .......... *A01G 25/023* (2013.01); *B29C 47/0023* (2013.01); *B29C 47/028* (2013.01)

(58) Field of Classification Search
CPC ............ A01G 2025/006; A01G 25/06; A01G 25/023; A01G 25/16; B05B 1/3006

USPC ............ 239/11, 542, 547, 728, 271, 569, 570
See application file for complete search history.

(56) References Cited

U.S. PATENT DOCUMENTS

| 5,022,940 A | 6/1991 | Mehoudar |
| 5,183,208 A | 2/1993 | Cohen |
| 5,634,594 A * | 6/1997 | Cohen .................. G05D 7/0113 239/533.13 |
| 5,829,685 A * | 11/1998 | Cohen .................. A01G 25/023 239/533.1 |

(Continued)

FOREIGN PATENT DOCUMENTS

| IL | 86549 | 4/1991 |
| WO | 2010/055530 | 5/2010 |
| WO | 2010/095127 | 8/2010 |

*Primary Examiner* — Arthur O Hall
*Assistant Examiner* — Joseph A Greenlund
(74) *Attorney, Agent, or Firm* — Rodney J. Fuller; Booth Udall Fuller, PLC

(57) ABSTRACT

A discrete flat dripper of the non-pressure regulated type of drippers or of the pressure compensated—flow rate regulated type of drippers, suited for being integrally installed within a hose, that comprises a body component whose configuration is essentially rectangular, wherein on its one side that is suited to being affixed to an internal wall of the hose, formed with an exit pool that it is elongated in its dimensions and substantially extends along the entire length of the body component, and with a flow passage circumferentially surrounding a substantial part of the elongated exit pool, and an integral dripper line wherein there are integrated at least one of such discrete flat dripper, and optionally and as enabled by the elongated exit pool, the water outlet opening that is formed at the hose wall opposite the elongated exit pool and within its boundaries, is in a configuration of a thin and long slit.

17 Claims, 3 Drawing Sheets

(56) References Cited

U.S. PATENT DOCUMENTS

Figure 1:
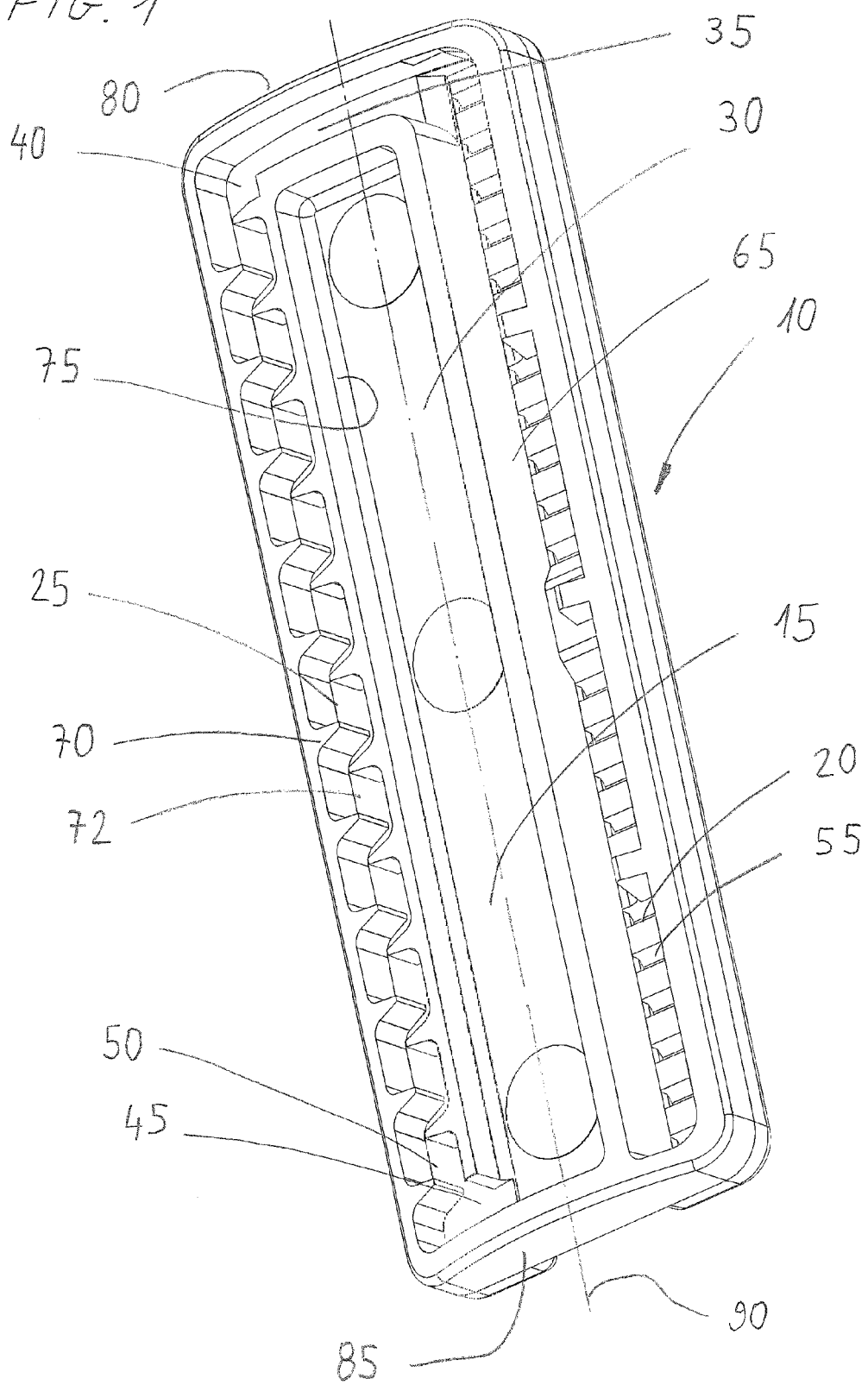

| | | | |
|---|---|---|---|
| 6,027,048 A * | 2/2000 | Mehoudar | A01G 25/023 138/42 |
| 6,206,305 B1 | 3/2001 | Mehoudar | |
| 6,382,530 B1 * | 5/2002 | Perkins | A01G 25/023 239/533.1 |
| 6,568,607 B2 | 5/2003 | Boswell | |
| 7,988,076 B2 * | 8/2011 | Mamo | A01G 25/023 239/533.1 |
| 8,002,496 B2 * | 8/2011 | Giuffre | A01G 25/023 239/542 |
| 8,096,491 B2 * | 1/2012 | Lutzki | F16K 23/00 239/533.1 |
| 8,141,589 B2 * | 3/2012 | Socolsky | A01G 25/023 138/37 |
| 8,317,111 B2 * | 11/2012 | Cohen | A01G 25/023 239/542 |
| 8,998,113 B2 * | 4/2015 | Keren | A01G 25/023 239/542 |
| 2005/0284966 A1 | 12/2005 | DeFrank | |
| 2009/0165879 A1 | 7/2009 | Socolsky | |
| 2009/0302127 A1 | 12/2009 | Lutzki | |
| 2012/0012682 A1 * | 1/2012 | Einav | B05B 1/20 239/542 |
| 2015/0150199 A1 * | 6/2015 | Kidachi | A01G 25/023 239/542 |

* cited by examiner

INTEGRAL DRIPPER WITH AN ELONGATED EXIT POOL

FIELD OF THE INVENTION

The invention, the subject matter of this patent application, is found in the field of drippers used for agricultural irrigating (watering) in general (in other words—drip irrigation emitters), and in the domain of the flat integral drippers in particular, namely—in the domain of drip irrigation emitters that are formed as flat, discrete units, that are integrated within an irrigation hose and positioned length wise along its length, at distances one from the other, wherein they are attached flush adjacent to the inner wall of the hose, and wherein they are formed with a water exit "pool" that is formed on their outer surface areas which are adapted to be affixed as said, to the inner wall of the hose, while the water outlet opening that is formed in the hose's wall opposite that water exit "pool" and within its bounds, provides for a water flow passage between the dripper's water exit "pool" and the external side of the hose, and hence enables the desired water exiting outwards from the irrigation hose.

BACKGROUND OF THE INVENTION

Methods and means for continuous manufacturing of integral dripper lines (known also as in-line drip lines), with discrete flat drippers (drip irrigation emitters) integrated in them, are familiar and well known. For example, integrating the drippers and attaching them flush unto the inner wall might be formed during the process of manufacturing the hose (in other words—the conduit, pipe or tube), by extrusion (see for example U.S. Pat. No. 5,022,940 or IL patent No. 86549).

In order to maintain a beneficial competitive edge, manufacturing of integrated dripper lines in which discrete flat drippers are integrated mandates as high as practicable manufacturing rates. From its inception, the drippers have to be designed in such a manner that it would be possible to feed (insert) them in the hoses production line at (very) high rates, while avoiding, as much as feasible—occurrences of mistakes in the feeding direction of the bodies of the discrete flat drippers relative to the wall of the hose. In other words, designers of the drippers are required to design the bodies of the drippers in a symmetric configuration, to the highest possible result, in order to reduce the impeding sorting operations—namely the requirements governing the preliminary adjustment and orientation of the dripper's body relative to the direction of the wall of hose, even before they are attached flush to the inner wall of the hose, so that for example, it would be feasible forming the water outlet opening in the wall of the hose, accurately facing (opposite) the exit "pool" and within its boundaries.

The drippers have to be made in small dimensions—in order to save on the costs of the raw material that serve for their production (and—as well—to enable their speedy feeding (insertion) as said). The raw material, from which the body of the dripper is manufactured, constitutes a dominant component of the cost of manufacturing of the integral dripper hoses. Hence, the designers of the drippers are requested to decrease and reduce as much as practicable the dimensions (size) of the drippers (and thus achieve the savings in the costs of the materials and of other attending costs).

As opposed to this, in order to facilitate as much as practicable, the task of conforming with the challenge of locating the water exit "pool" that is formed in the body of the dripper and forming the water outlet openings in the wall of the hose, accurately (exactly) into it and within its boundaries, the designers of the drippers strive precisely to increase and widen, as much as possible, the surface area of that water exit "pool".

Rather in the same manner, striving to filter as much as possible the water entering into the dripper (in order to prevent the formation or development of clogging up in the narrow passage of the pressure reducing mechanism in the dripper), this need also mandates assigning substantial area for increasing the area of the filtering means (and thus increasing the dripper's size). Similarly, striving to leave as large as possible minimal flow passage in the water pressure reducing means formed in the dripper (for example—the flow passage formed between the baffles of a water pressure reducing means of the labyrinth type), in order to prevent clogging, also precisely drives to increase the dripper size (and as per the example above, assigning a larger area to the labyrinth type water pressure reducing means enables to lengthen it, and this lengthening in its turn enables to increase the dimensions of the minimal flow passage in it).

An additional aspect which is critical in the realm of manufacturing integral dripper hoses with flat drippers integrated in them is the required assurance of properly affixing the body of the dripper unto the inner wall of the hose. Irrigating hoses might be manufactured in a variety of inner diameters. In order to achieve reliable affixing of the body of the dripper unto the surface of the inner wall of the hose and because of the aforesaid large variety of actually manufactured different hoses, it is necessary to achieve suitability of the surface of the flat drippers that are adapted to be affixed flush unto the surface of the inner wall of the hose, to the outline of the surface of the inner wall of the hose (an outline that—in accordance to all the stipulations that were stated above might be different from one to another in accordance with the inner diameter of a specific hose). Hence, it is familiar and well known in this field—to form the surface of the flat drippers that are intended to be attached (affixed) flush to the inner wall of the hose, in an arched outline (in accordance with the inner radius of the hose). The variety of the diameters of the hoses might, hence, necessitate forming bodies of drippers with surface outlines in accordance with the specific radius of the inner wall of the hose unto which the drippers are designated to be affixed or alternatively, the designers of the drippers strive precisely to narrow, as much as possible, the dripper's width (in order that they will properly affixed to a variety of inner diameters).

Integral dripper hoses might be buried in the ground (in order to ensure fast wetting of the ground and in order to prevent their moving in high winds). Burying the hose in the ground might worsen the problem of clogging from the instant that the water pressure drops in the hose and causes a phenomenon of sucking (suction) from the outside inwards of soil, sand, debris and the like. A familiar and well known solution is forming a water exit outlet at the wall of the hose in a configuration of an elongated narrow slit such that as the water pressure drops inside the hose, it "closes" itself within the hose and prevents contaminating bodies from entering from the instant the sucking phenomena starts. This type of solution is known for applications of integral dripper hoses in which a continuous and flat strip of drippers is integrated (as different from the discrete flat drippers hose). The configuration of the continuous strip enables forming a long water exit "pool" along the pressure reducing means, in a manner that enables forming the elongated and narrow slit at the wall of the hose within its domain.

There exists a snag here—that in integrated dripper hoses with flat discrete drippers integrated in them (as different from integral irrigating hoses with a continuous strip of drippers), the water exit "pool" that is formed in each and every one of the discrete drippers, has to be of large enough dimensions, so that the water exit outlet (in the thin and elongated slit configuration as is required) would verily be amenable to be formed on the wall of the hose opposite said specific "pool" wherein it connects to a flow passage between it and the outer side of the hose, but also at the same time is characterized by the property of "self closing" from the instant the water pressure is being reduced in the hose (which is the possible solution to the suction problem and the danger of clogging following it, as we have pointed above). A design challenge that makes the situation seven more stringent—achieving the "self closing" property necessitates a relative long slit. Increasing the length of the slit compels (dictates) to increase as well the dimensions of the "pool" in the body of the discrete dripper, in a manner that on the face of it is in contradiction to the other challenge of reducing the dimensions of the dripper as we have pointed before.

Thus, as per integral dripper hoses with relatively thin walls, it is rather common, for example, to encounter the usage of flat and continuous strip drippers that—as said—enables forming sufficient long enough exit "pools" that would include within their boundaries the relatively long slit formed at the thin wall of the hose. But also, simultaneously, the flat and continuous strip embodies drawbacks—more raw material is required to produce it (in comparison to discrete drippers), and also its water pressure reducing means formed in it, does not benefit from the advantages of accuracy that injection technology provide (as in the manufacturing of discrete drippers), for example—forming a water pressure reducing means of the labyrinth type on a flat and continuous strip is executed by the embossing technology that does not enable to achieve accuracy in the dimensions of the minimal flow passage between the labyrinth's baffles in comparison with the (rather) substantial accuracy that might be achieved when forming the dripper by injection technology (that is executed, as said, when manufacturing a discrete dripper).

Thus, in the time that preceded the present invention, there existed a need for integral flat drippers, discrete, that would be small in their dimensions, that would not require complicated adjustment and orientation operations before being affixed (attached) flush to the inner wall of the hose, enable efficient filtering of the water entering into them and providing efficient reduction of the pressure of the water while maintaining large as possible minimal flow passage at the water pressure reduction means that is implemented for this purpose (for example—a labyrinth), that would facilitate conforming with the challenge of forming a water exit outlet in the wall of the hose, with accuracy so that it is exactly opposite the exit "pool" that is formed on them, and that would also enable using a water exit outlet endowed with "self closing" features (namely—having a water exit outlet in a narrow and long slit configuration).

SUMMARY OF THE PRESENT INVENTION

This summary section of the patent application is intended to provide an overview of the subject matter disclosed herein, in a form lengthier than an "abstract" and should not be construed as limiting the invention to any features described in this summary section.

The present invention provides means to handle the need that we have pointed at earlier—by implementing a discrete, flat dripper that is suited to be integrally assembled within a hose and that—as any integral dripper like it, comprises a body component of an essentially rectangular configuration that—on its one side, the one that is suited to be attached flush to the inner wall of the hose, is formed with filtering means, water pressure reducing means and an exit pool with a flow passage that is connected to a flow passage of filtered water from the filtering means to one end of the water pressure reducing means and with a water exit that is connected to a water passage of filtered water that their pressure was reduced, from the other end of the of the pressure reducing means to the exit "pool".

A prominent characterizing feature of a discrete flat dripper in accordance with the present invention, is the existence of its exit pool that is formed wherein it is elongated in its dimensions and substantially stretched (extending) along the entire length of the body component, wherein on its one side, alongside all its length and parallel to it, the water filtering means is extended, and on its other side, also along its full length and parallel to it, the water pressure reducing means similarly extends, and the water passage is formed wherein it extends at one end transversely across the width of the body component and the water exit opening is formed on the other end of the body component.

In an additional and different aspect of a discrete flat dripper in accordance with the present invention, the forming (shaping) of the exit pool, wherein it is elongated in its dimensions and substantially stretched (extending) along the complete length of the body component, defines a length-wise axis that the water filtering means and the water pressure reducing means are formed in a symmetric way relative to it (in a manner that eliminates the need for operations of adjustment and setting the orientation in the "forward—backward" dimension, namely—enabling the feeding of the drippers either front forward or with its stern forward).

In another additional and different aspect of the present invention, it is embodied also in integral drippers hose (in-line drip irrigation hose) in which one or more drippers of the type described in the preceding summary above are integrated.

In an additional and different aspect of an integral drippers hose in accordance with the present invention, the water exit outlets that are formed in the wall of the hose opposite the exit pools that are formed in the discrete flat drippers in accordance with the present invention, wherein they are elongated in their dimensions and within their boundaries, those water exit outlets are in the configuration of a narrow and long slit endowed with "self closing" properties as explained above, at the instant that the water pressure start to decrease in the hose.

BRIEF DESCRIPTION OF THE
ACCOMPANYING FIGURES

Examples illustrative of embodiments of the invention are described below with reference to figures attached hereto. In the figures, identical structures, elements or parts that appear in more than one figure are generally labeled with a same numeral in all figures in which they appear. Dimensions of components and features shown in the figures are generally chosen for convenience and clarity of presentation and are not necessarily shown to scale. The figures (Fig's) are listed below.

FIG. 1 constitutes a view in perspective of an example of a dripper in accordance with the present invention.

Figure 2:
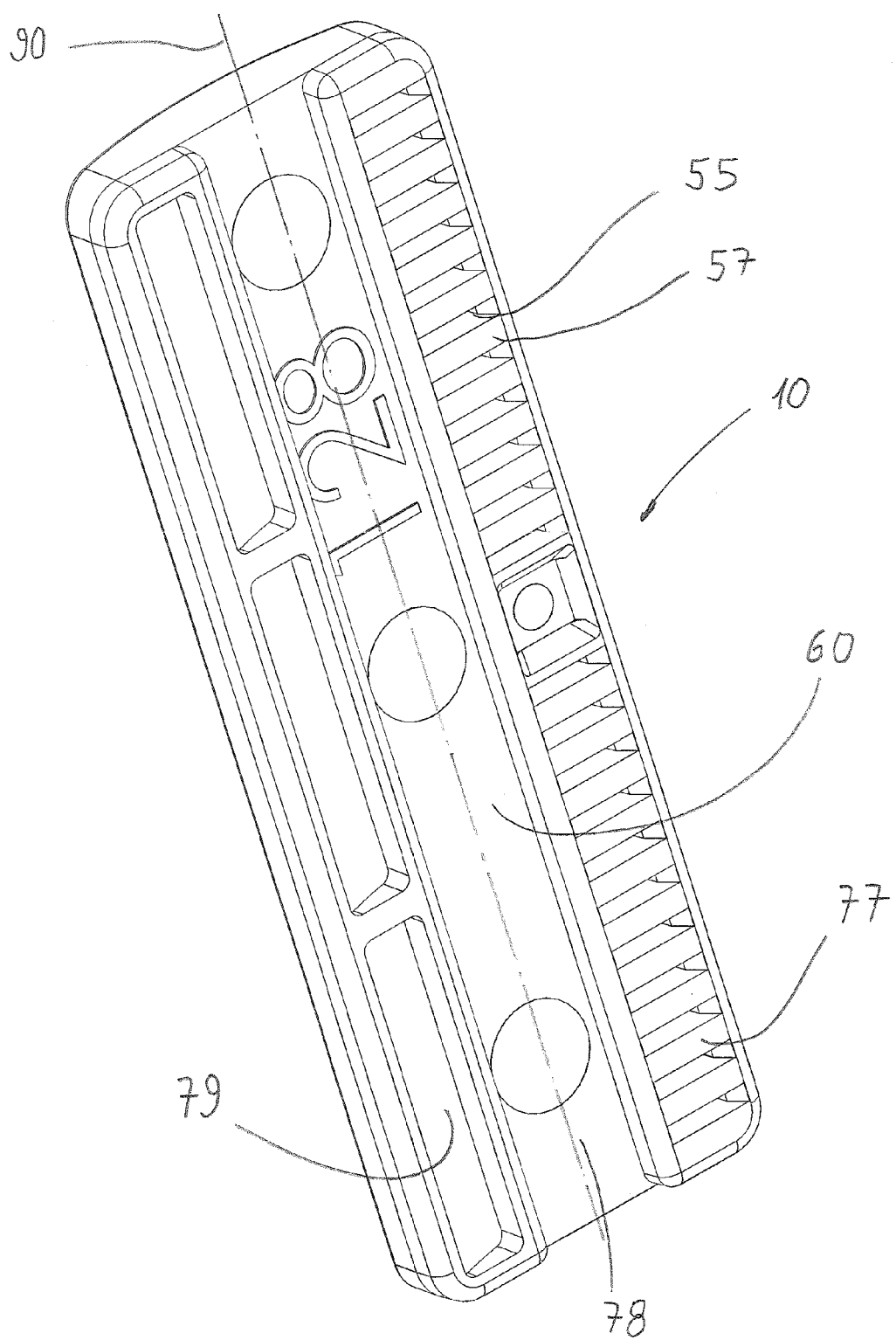

FIG. 2 constitutes a view in perspective from another angle of the dripper that is illustrated in FIG. 1.

Figure 3:
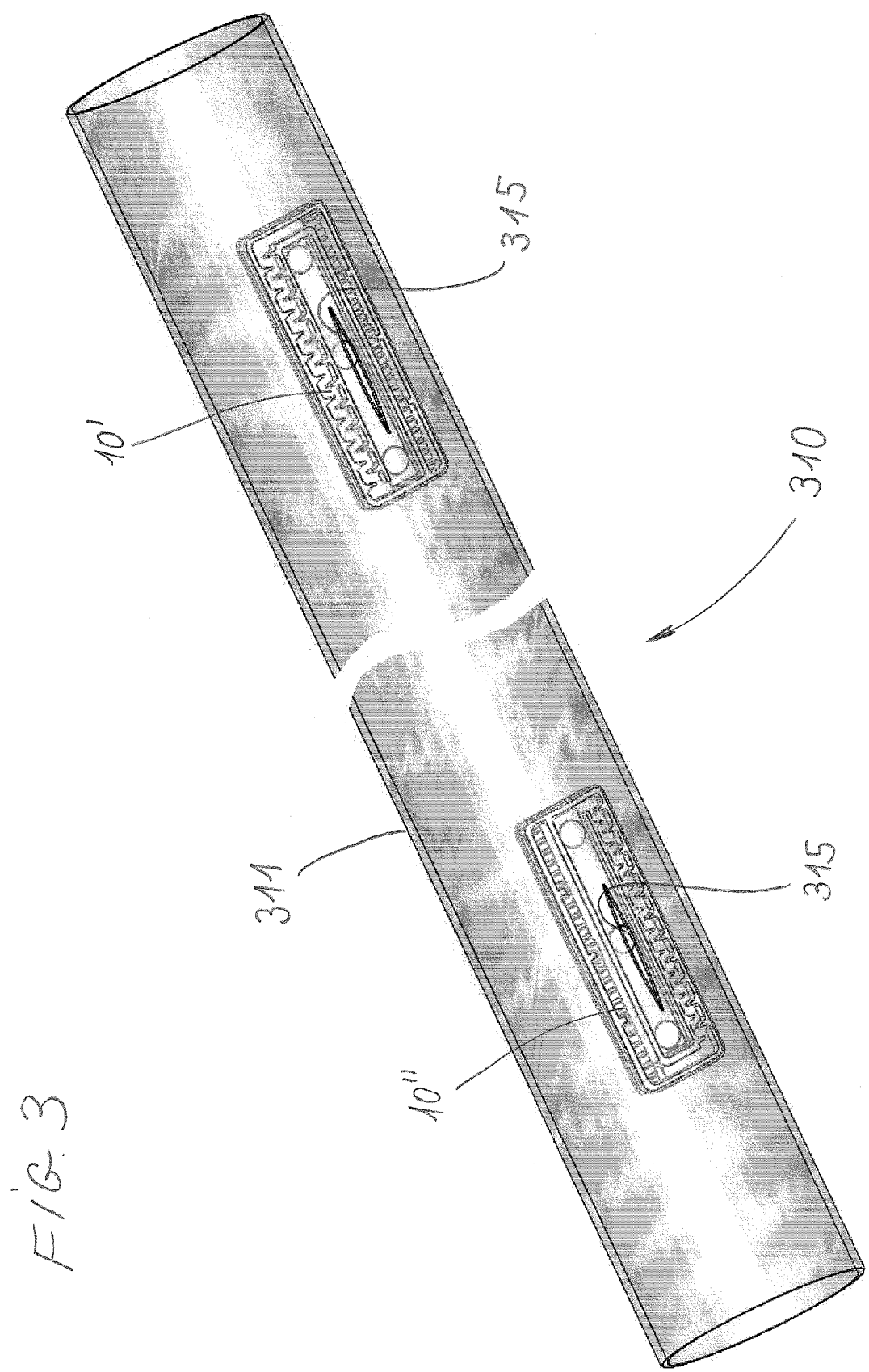

FIG. 3 constitutes a view in perspective of a sector of an integral dripper hose in which there are integrated drippers that were illustrated in FIGS. 1 and 2.

DETAILED DESCRIPTION OF A PREFERRED EMBODIMENT

In the following description, various aspects of the invention will be described. For the purpose of explanation, specific configurations and details are set forth in order to provide a thorough understanding of the techniques. However, it will also be apparent to one skilled in the art that the techniques may be practiced without specific details being presented herein. Furthermore, well-known features may be omitted or simplified in order not to obscure the description(s) of the techniques.

Reference is being made to FIGS. 1 and 2. In FIGS. 1 and 2 there are illustrated examples of a dripper 10 in accordance with the present invention (views in perspective and from two different angles).

Any professional in the field would easily understand that the topic being discussed is a discrete, flat dripper that is suited for being integrally assembled within an irrigation hose. A mono-component dripper that is regularly manufactured by an injection process of plastic material into a mold, is in a configuration of a body component that has an essentially rectangular configuration, wherein on its one side—15, namely the side that is suited to being affixed flush unto the inner wall of the hose (that is not illustrated), formed with filtering means 20, water pressure reducing means 25, and exit pool 30. A flow passage 35 connects to a flow passage of filtered water from filtering means 20 to one end 40 of the water pressure reducing means 25. A water exit opening 45 leads to a flow passage of filtered water that their pressure was reduced—from the other end 50 of the water pressure reducing means 25 to exit pool 30.

In the example flat and discrete dripper 10 that is illustrated in the figures, water filtering means 20 comprises an array of slots 55 that are coupled to the passage of water flow through them from the other side—60 of the dripper's body component, that from the instant of affixing its one side—15 to the inner wall surface of the hose (that is not illustrated), directed to the direction of the inside of the hose. A routing (steering) channel 65 extends along the entire length and parallel to exit pool 30, coupled to the passage of a water flow of filtered water through it from the slots array 55, and routs the flow of the filtered water towards flow passage 35.

In the example flat and discrete dripper 10 that is illustrated in the figures, water pressure reducing means 25, includes an array of baffles 70 resembling a labyrinth, that is formed with a water flow passage 72 through it (a passage that its dimensions define the minimal flow passage through the labyrinth), and wherein passage 72 is coupled on its one end 40—to flow passage 35, and on its other side—50, to the water exit opening 45.

Any professional would understand that the configuration of the filtering means 20 and the water pressure reducing means 25, that are illustrated in the figures and were described above, might also be in different and various shapes, for example an array of round filtering openings instead of the above cited slots 55, a thin and long flow passage instead of the cited labyrinth 70, and so on.

Any professional that is also familiar with the field of manufacturing integral dripper hoses, would appreciate the forming the filtering means 20 and the water pressure reduction means 25 in the illustrated example, while exploiting for this purpose the sorting stairs 77 and 79, namely the stairs that are required, and serve to sort the drippers' bodies before being fed into the hose (in the "up/down" orientation). Upon utilizing sorting stairs 77 and 79 for the forming of filtering means 20 and the water pressure reduction means 25, the given thicknesses of sorting stairs 77 and 79 enables to increase the dimensions of ribs 57 between slots 55, deepening routing channel 65 and deepening baffles array 70.

In the example of the flat and discrete dripper 10 that is illustrated in the figures, exit pool 30 comprises a circumferential array of walls 75 that separates between it and filter means 20, that extends on its one side, water pressure reducing means 25 that extends on its other side and water flow passage 35 that extends on it other end—80, of the dripper's body component. Any professional would understand that from the instant of affixing dripper 10 to the inner wall surface of the hose (that is not illustrated), walls array 75 is also affixed to the inner wall surface of the hose and prevents the water from leaking into exit pool 30, except if the topic is flow of the filtered water that were routed (steered) through flow passage 35, passed through flow passage 72 while reducing the water pressure that exists there and entered to the pool through water exit opening 45.

Dripper 10 is characterized in that exit pool 30 is formed wherein it is elongated in its dimensions and substantially extends along the complete length of the body component of the dripper, wherein on its one side on its entire length and parallel to it, there extends said filter means 20 and on its other side—also along all its entire length and parallel to it, extends the water pressure reducing means 25. Flow passage 35 is formed so that it extends on the one end—80 of the dripper's body component where it extends transversely across its width, and water exit opening 45 is formed at the other end 85 of the dripper's body component.

Any professional would understand that in the illustrated example—the forming of the exit pool 30 wherein it is elongated at its dimensions and substantially extends along the entire length of the dipper's body—defines a length-wise axis 90, wherein filter means 20 and water pressure reducing means 25 are formed in a symmetric manner relative to it.

Any professional would also understand that the symmetric configuration combined with the modest dimensions of flow passage 35, might eliminate and cancel the need (requirement) for adjustment and orientation operations of dripper 10 in the "Forward—Backward" aspect, before the dripper is being affixed to the wall of the hose (namely—it will make no difference whether dripper 10 would be fed face forward or stern forward), (and see also down below when referring to FIG. 3).

Furthermore, the symmetric configuration while the filtering means and the water pressure reducing means are being extended on the two sides of the exit pool and parallel to it, does not cause a substantial increase in the width (lateral) dimension of dripper 10. This is to say, the width of dripper 10 remains narrow enough in order to instill on it versatility character in all that is connected to the capability of affixing it to a variety of different internal diameters of the different hoses (without having to restore to adapting the outline of its surface to the specific radius of the hose).

Any professional that is also familiar with the manufacturing by injection of the dripper's components s, would appreciate the forming of exit pool 30 in an elongated shape as well as the elongated shape of the "valley" 78 between the two sorting stairs 77 and 79 for another and additional aspect—the ability to continuously support the just injected dripper from both sides while following its extraction from the mold.

Let's refer to FIG. 3. FIG. 3, in which a sector of hose 311 of an integral dripper line 310 is illustrated. In it there are integrated discrete, flat drippers 10. In the illustrated sector 311, two drippers 10' and 10" are illustrated wherein they are integrated within the hose.

Drippers 10' and 10" are illustrated as they were fed to and positioned wherein the stern of one of them is directed to the right whereas the stern of the second is directed to the left. Thus, and as we have explained above when referring to FIGS. 1 and 2, the symmetric configuration of dripper 10, together with the modest dimensions of flow passage 35, might eliminate and cancel the need for adjustments and orientation operations of the dripper 10 in the dimension of the "forward"—"backward", before it being affixed to the wall of the hose (i.e., it makes no difference whether dripper 10 would be fed face forward or stern forward).

This, and more—the water outlet openings 315 that are formed in the wall of hose 311 facing the elongated exit pools of the drippers and within their boundaries, are in the configuration of a thin and long slit endowed by the self closing property from the instant the water pressure in the hose declines.

Thus, configuring exit pool 30, wherein it is elongated in its dimensions and substantially extends along the entire length of the body component of dripper 10, enables to implement a water outlet opening in the form of a thin and long slit in conjunction with a discrete dripper.

Moreover, as we have pointed above, the symmetric configuration of dripper 10 coupled with the modest dimensions of flow passage 35, might also enable implementing such an outlet opening independently of the direction of feeding the discrete drippers.

It is to be noted that the hose 311 is illustrated as an extruded hose, but any professional would understand that discrete and flat integral drippers in accordance with the present invention might also be implemented also on a flat sheet before it is folded to make a hose with a seam ("stitch") or serve as integral drippers in a tubular (hose like) conduit that is implemented by another and different technology (for example—blowing).

Subject to what is described above while referring to the accompanying figures, any professional in drip irrigation devices design would appreciate the advantages of the discrete, flat dripper in accordance with the present invention Relatively small in its dimensions, in a manner that leads to saving on the raw materials required for its production; thin enough at its width dimension so as to instill on it versatility in all that is concerned with capability to affixing the drippers in a wide range of inner diameters of the hoses; it might be symmetric in a manner that would not impose adjustments and orientation operations of the "forward"—"backward" aspect (namely—it makes no difference whether the dripper is fed with the front forward or with the stern forward); having filtering means large enough—in order to ensure efficient filtering of the flow of the water into it; endowed with water pressure reducing means (for example in the configuration of a labyrinth)—that is long enough in order to ensure efficient reduction of the water pressure while maintaining a minimal passage of water flow that is wide enough for reducing the danger of being clogged (blocked up); and formed with relatively large exit "pool" in a manner that substantially facilitates to conform with the challenge of forming a water outlet opening in the wall of the hose, with accuracy so that it is exactly opposite the exit "pool" and that would also enable using a water outlet opening endowed with "self closing" features (namely—having a water outlet opening in a narrow and long slit configuration).

The invention has been described using various detailed descriptions of embodiments thereof that are provided by way of example and is not intended to limit the scope of the invention. A described embodiment might comprise different features, not all of which are required in all embodiments of the invention. Some embodiments of the invention utilize only some of the features or possible combinations of the features. Variations of the embodiment of the invention that is described and embodiments of the invention comprising different combinations of features noted in the described embodiment will occur to persons with skill in the art. It is intended that the scope of the invention be limited only by the claims and that the claims be interpreted to include all such variations and combinations.

The invention claimed is:

1. A discrete flat dripper that is suited for being integrally installed within a hose, comprising:
   a substantially rectangular body component configured to affix to an internal wall of said hose;
   an elongated exit pool formed on said body component and substantially extending along a length of said body component; and
   a circumferential flow passage circumferentially surrounding a substantial part of said elongated exit pool for routing the water that entered into the dripper towards said exit pool, wherein said circumferential flow passage comprises
   a filter,
   a water pressure reducer,
   a transverse flow passage that connects a first end of said filter to a first end of said water pressure reducer; and
   a water exit opening that connects, for flow passage of filtered and pressure reduced water, from a second end of said water pressure reducer to said elongated exit pool;
   wherein the dripper is of a non-pressure regulated type dripper, and wherein said filter extends along and parallel to a first side of said elongated exit pool, and said water pressure reducer extends along and parallel to a second side of said elongated exit pool, the second side and the first side of said elongated exit pool being opposite each other; and wherein said transverse flow passage transverses across the width of said body component proximate a first end of said body component, and said water exit opening is formed at a second end of said body component, the second end and the first end of said body component being opposite each other and orthogonal to the first and second sides of said elongated exit pool.

2. The discrete flat dripper in accordance with claim 1, wherein said elongated exit pool has elongated dimensions and substantially extends along an entire length of said body component, defining a lengthwise axis so that said circumferential flow passage is formed in a substantially symmetrical manner relative to the lengthwise axis.

3. The discrete flat dripper in accordance with claim 1, wherein said filter comprises:
   an array of slots that are connected for flow of water through the array of slots from the first side of said body component that, from the instant of affixing said body component to said inner wall of said hose, are directed towards the inside of the hose, and
   a routing channel that extends along an entire length and parallel to said exit pool, coupled for passage of filtered water flow into the routing channel from said array of slots, and routes filtered water on towards said transverse flow passage.

4. The discrete flat dripper in accordance with claim 1, wherein said water pressure reducer comprises a baffles array resembling a labyrinth that is formed with a water pressure reducer passage through the baffles array, and wherein a first end of said water pressure reducer passage is coupled to said transverse flow passage and a second end of said water pressure reducer passage is coupled to said water exit opening.

5. The discrete flat dripper in accordance with claim 1, wherein said exit pool comprises a circumferential walls array that separates said filter, said water pressure reducer and said transverse flow passage.

6. The discrete flat dripper in accordance with claim 1, wherein said elongated exit pool has elongated dimensions and substantially extends along an entire length of said body component, defining a lengthwise axis so that said filter and said water pressure reducer are formed in a substantially symmetrical manner relative to the lengthwise axis.

7. A discrete flat dripper that is suited for being integrally installed within a hose, comprising:
- a substantially rectangular body component configured to affix to an internal wall of said hose;
- an elongated exit pool formed on said body component and substantially extending along a length of said body component, wherein said elongated exit pool has elongated dimensions and substantially extends along an entire length of said body component, defining a lengthwise axis so that said circumferential flow passage is formed in a substantially symmetrical manner relative to the lengthwise axis; and
- a circumferential flow passage circumferentially surrounding a substantial part of said elongated exit pool for routing water that entered into the dripper towards said exit pool, wherein said circumferential flow passage comprises
  a filter,
  a water pressure reducer,
  a transverse flow passage that connects a first end of said filter to a first end of said water pressure reducer; and
  a water exit opening that connects, for flow passage of filtered and pressure reduced water, from a second end of said water pressure reducer to said elongated exit pool;
  wherein the dripper is of a non-pressure regulated type dripper, and wherein said filter extends along and parallel to a first side of said elongated exit pool, and said water pressure reducer extends along and parallel to a second side of said elongated exit pool, the second side and the first side of said elongated exit pool being opposite each other; and wherein said transverse flow passage transverses across the width of said body component proximate a first end of said body component, and said water exit opening is formed at a second end of said body component, the second end and the first end of said body component being opposite each other and orthogonal to the first and second sides of said elongated exit pool.

8. The discrete flat dripper in accordance with claim 7, wherein said filter comprises:
- an array of slots that are connected for flow of water through the array of slots from the first side of said body component that, from the instant of affixing said body component to said inner wall of said hose, are directed towards the inside of the hose, and
- a routing channel that extends along an entire length and parallel to said exit pool, coupled for passage of filtered water flow into the routing channel from said array of slots, and routes filtered water on towards said transverse flow passage.

9. The discrete flat dripper in accordance with claim 7, wherein said water pressure reducer comprises a baffles array resembling a labyrinth that is formed with a water pressure reducer passage through the baffles array, and wherein a first end of said water pressure reducer passage is coupled to said transverse flow passage and a second end of said water pressure reducer passage is coupled to said water exit opening.

10. The discrete flat dripper in accordance with claim 7, wherein said exit pool comprises a circumferential walls array that separates said filter, said water pressure reducer and said transverse flow passage.

11. The discrete flat dripper in accordance with claim 7, wherein said elongated exit pool has elongated dimensions and substantially extends along an entire length of said body component, defining a lengthwise axis so that said filter and said water pressure reducer are formed in a substantially symmetrical manner relative to the lengthwise axis.

12. A discrete flat dripper that is suited for being integrally installed within a hose, comprising:
- a substantially rectangular body component configured to affix to an internal wall of said hose;
- an exit pool formed on said body component and substantially extending along a length of said body component; and
- a circumferential flow passage circumferentially surrounding a substantial part of said exit pool for routing water that entered into the dripper towards said exit pool, wherein said circumferential flow passage comprises
  a filter extending along a first side of said exit pool,
  a water pressure reducer extending along a second side of said exit pool, the second side and the first side of said exit pool being opposite each other,
  a transverse flow passage that connects a first end of said filter to a first end of said water pressure reducer; and
  a water exit opening that connects a second end of said water pressure reducer to said exit pool;
  wherein said transverse flow passage transverses across the width of said body component proximate a first end of said body component, and said water exit opening is formed at a second end of said body component;
  wherein the second end and the first end of said body component are opposite each other and orthogonal to the first and second sides of said exit pool.

13. The discrete flat dripper in accordance with claim 12, wherein said exit pool has elongated dimensions and substantially extends along an entire length of said body component, defining a lengthwise axis so that circumferential flow passage is formed in a substantially symmetrical manner relative to the lengthwise axis.

14. The discrete flat dripper in accordance with claim 12, wherein said filter comprises:
- an array of slots that are connected for flow of water through the array of slots from the first side of said body component that, from the instant of affixing said body component to said inner wall of said hose, are directed towards the inside of the hose, and
- a routing channel that extends along an entire length and parallel to said exit pool, coupled for passage of filtered water flow into the routing channel from said array of slots, and routes filtered water on towards said transverse flow passage.

15. The discrete flat dripper in accordance with claim 12, wherein said water pressure reducer comprises a baffles array resembling a labyrinth that is formed with a water pressure reducer passage through the baffles array, and wherein a first end of said water pressure reducer passage is coupled to said transverse flow passage and a second end of said water pressure reducer passage is coupled to said water exit opening.

16. The discrete flat dripper in accordance with claim 12, wherein said exit pool comprises a circumferential walls array that separates said filter, said water pressure reducer and said transverse flow passage.

17. The discrete flat dripper in accordance with claim 12, wherein said exit pool is elongated in its dimensions and substantially extends along an entire length of said body component, defining a lengthwise axis so that said filter and said water pressure reducer are formed in a substantially symmetrical manner relative to the lengthwise axis.

\* \* \* \* \*